June 26, 1951     D. L. MARKUSEN     2,558,096
FLIGHT CONTROL APPARATUS Filed Aug. 19, 1946     2 Sheets-Sheet 1

INVENTOR.
DAVID L. MARKUSEN
BY
George H. Fisher
ATTORNEY

June 26, 1951  D. L. MARKUSEN  2,558,096
FLIGHT CONTROL APPARATUS
Filed Aug. 19, 1946
2 Sheets-Sheet 2

INVENTOR.
DAVID L. MARKUSEN
BY
George N. Fisher
ATTORNEY

Patented June 26, 1951

2,558,096

UNITED STATES PATENT OFFICE 2,558,096

FLIGHT CONTROL APPARATUS

David L. Markusen, Minneapolis, Minn., assignor to Minneapolis-Honeywell Regulator Company, Minneapolis, Minn., a corporation of Delaware Application August 19, 1946, Serial No. 691,632

21 Claims. (Cl. 244—77)

This invention pertains to the control of an aircraft in flight.

The object of this invention is to provide apparatus for operating the control surfaces of an aircraft in flight and more particularly of an aircraft popularly known as the Flying Wing which is actually a tailless airplane.

The Flying Wing airplane differs radically from the conventional type of airplane. The conventional airplane consists of a somewhat elongated fuselage or body portion having wings supported therefrom near the front of the fuselage. The after portion of the fuselage supports the tail surfaces of the airplane. Control of the airplane about its roll axis is obtained by means of ailerons mounted near the extremities of the wings. Control of the plane about the turn axis is obtained by means of a rudder mounted in the tail surface. Control of the airplane about the pitch axis is obtained by means of elevators mounted in the tail surface.

In the Flying Wing airplane, the tail is omitted from the structure of the aircraft. The control surfaces are all mounted in the wing. Control of the Flying Wing about its turn axis is obtained by means of two rudders, one of them being mounted in the trailing edge of each wing near the tip thereof. The rudders of the Flying Wing are given this term merely because they, like the conventional rudder, control the movement of the Flying Wing about the turn axis. Structurally they do not resemble the conventional rudder. A rudder of the Flying Wing when operated merely increases the resistance of its particular wing to thereby cause the plane to turn in an arc about the turn axis.

Control of the Flying Wing about its pitch and roll axis is obtained by a single set of two control surfaces. One of these control surfaces is mounted in the trailing edge of each wing inboard of the rudder. These surfaces are so operated that at times they move in the same direction together at which time they function as elevators. At other times they are differentially moved in opposite directions so that they function as the conventional ailerons. These control surfaces are called elevons.

With this brief description of the Flying Wing, an object of this invention is to provide an automatic flight control system or a manually operated flight control system for a Flying Wing.

A further object of this invention is to provide an automatic flight control system for a Flying Wing in which automatic means are provided to stabilize the direction of movement of the aircraft about its turn axis, to provide means for stabilizing the aircraft with respect to its roll axis and to provide means to stabilize the plane with respect to its pitch axis.

A further object of this invention is to provide a control from the directional stabilizing means to the rudder operating means and to the elevon operating means.

A further object of this invention is to provide a control between the means for stabilizing the plane about the roll axis and the elevon operating means and also the rudder operating means.

A further object of this invention is to control the operating means for the elevons of a Flying Wing so that they may be moved concomitantly in the same direction.

A further object of this invention is to control the operating means for the control surface of a Flying Wing by means of several networks in which unbalance of the networks causes the operation of the operating means.

A further object of the invention is to control the operating means for the elevons by means of two interrelated networks, one network functioning to control the operating means so that the elevons move in the same direction so as to function as elevators, and the second network controlling the operating means for the elevons so that they move in opposite directions so as to function as ailerons.

A further object of this invention is to provide two interrlated networks for controlling the operation of the elevons and in which a voltage signal derived from one network is applied to the other network to control the operation of the elevons in the same direction as elevators and in which a second signal derived from the other network controls the operation of the elevons in opposite directions as ailerons.

A further object of this invention is to provide novel control means for the operation of the elevons of the Flying Wing through two interrelated networks in which a signal derived from one network is applied through a transformer coupling to the second network to cause the operation of the elevons in the same direction as elevators and in which follow up means driven by said operating means set up a balance signal in said other network to terminate operation of said elevons.

A further object of this invention is to provide novel operating means for the rudders of the Flying Wing so that only one rudder is in operated position at one time.

A further object of this invention is to control the operation of the rudders of a Flying Wing through a series of networks in which a signal derived from a network may cause the operation of one or the other of the rudder operating means, but not both.

A further object of this invention is to provide separate operating means for the two rudders of a Flying Wing which operating means are so interrelated with a control means that one rudder must be in closed position before the other rudder may be moved toward open position.

Other objects and advantages of the invention may be ascertained by referring to the specification and drawings and from a consideration of the appended claims; in the drawing.

Figure 1:
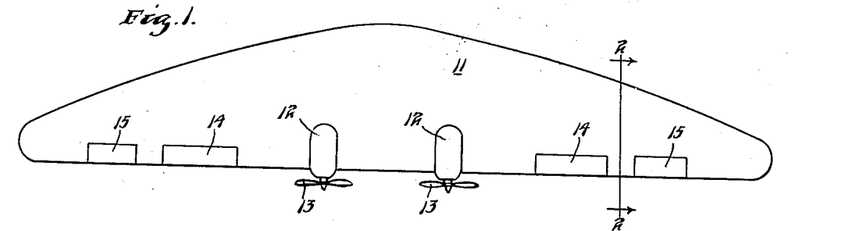
Figure 1 is a plan view of a Flying Wing or tailless airplane.
Figure 2:
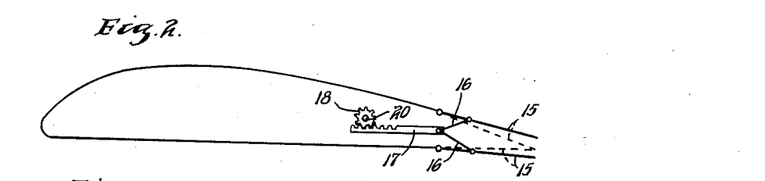
Figure 2 is a section along line 2—2 of Figure 1, the dotted lines representing the control members for the aircraft in closed position.

In Figure 1 there is shown a plan view of what may be termed a Flying Wing or tailless airplane. This airplane as shown has no tail surface as is present in the conventional aircraft. The body of the Flying Wing is made up entirely of the wing itself to decrease the drag effect on the aircraft. The Flying Wing is of the pusher type of aircraft having motors 12 which drive propellers 13 for propelling the craft. Control of the Flying Wing about the pitch and roll axes is obtained by means of elevons 14 which at times move together in the same direction and therefore partake of the nature of elevators and at other times move in opposite directions when they are in the nature of ailerons. The elevons may be independently mounted directly upon shafts, not shown, for operative movement. Rudders 15 are used to control the movements of the craft about the turn axis. The rudders, as shown in Figure 1, are placed near the tip of the wing. Figure 2 represents a section of the right wing showing the details of a rudder and a portion of its operating mechanism. A rudder for each wing comprises two members 15 which are pivoted to the wing. As shown, these members move in a vertical plane toward or away from the surface of the wing. The rudder members may be operated through links 16 pivoted thereto. These links have their opposite ends connected or pivoted to a slidable rack bar 17. The rack bar may be driven from a gear 18 which is mounted on a shaft 20 of a rudder actuating servomotor. A similar arrangement for operating the rudder in the left wing of the airplane from a servomotor operated shaft is also provided. The shaft 20 is driven from a servomotor 30 shown in Figure 4. A similar shaft for operating the rudder mounted in the left wing is shown at 21. This shaft 21 is operated from a servomotor 31. The servomotors 30 and 31 may be of any conventional form. For example, they may be of the type disclosed in application Serial No. 447,989, filed June 22, 1942.

These servomotors contain two relays for controlling the direction of operation of the output shafts. Such corresponding relays of the servomotor 30 are indicated by reference characters 32 and 33. In servomotor 31 the corresponding relays are designated by reference characters 34 and 35.

The energization of relay coils 32, 33, 34 and 35 is controlled by a pair of relays 43 and 45 forming part of an amplifier 40. The relay 43 includes a single pole single throw switch 44 which is biased to open position and is moved to closed position upon energization of the relay 43. Similarly, the relay 45 comprises a single pole single throw switch 46 which is likewise biased to open position and is moved to closed position upon energization of relay 45. One terminal of switch 44 of relay 43 is connected to the positive terminal of a battery, the other terminal of which is grounded. The opposite terminal of switch 44 is connected to relay coil 33 of servomotor 30 and relay coil 35 of servomotor 31, so that switch 44 controls the energization of relay coils 33 and 35. The switch 46 of relay 45 is likewise connected to a positive terminal of a battery, the other terminal of which is grounded. The other terminal of switch 46 is connected to relay coils 32 and 34 so that switch 46 controls the energization of relay coils 32 and 34.

The amplifier 40 is of any suitable type in which one or the other of two relays is energized depending upon the phase of the input voltage. A typical amplifier of this type is that shown in the copending application of Albert P. Upton, Serial No. 447,989, filed June 22, 1942. As shown in the drawing, the amplifier 40 has input terminals 41 and 42 to which a control signal may be applied. The amplifier 40 has its output terminals 47, 48 connected to a source of line voltage 100. This source of line voltage may be an inverter of the conventional electrical system in an aircraft or similar source of supply voltage. The switches 44 and 46 of amplifier 40 are selectively actuated by their respective relays 43 and 45 which are in the output side of amplifier 40 depending upon the phase relationship of the input voltage across terminals 41 and 42 with respect to the voltage across terminals 47 and 48 supplied by the line.

The circuit through coil 35 of servomotor 31 is completed from the opposite end of the coil through a lead 60 to an outer contact 66 of a limit switch 61, thence to the inner contact 68 of the limit switch 61, lead 63, left contact 64, of a single pole double throw snap action switch to the middle pole 65 of said snap action switch, thence to ground. The circuit through relay coil 34 of servomotor 31 is completed from opposite end through lead 70 to a left contact 71 of a single pole double throw snap action switch to the movable arm 72 of said switch and thence to ground. The circuit through relay coil 33 of servomotor 30 is completed from its other end through a lead 80, right contact 81 of a single pole double throw snap action switch to the middle arm 65 of the switch and thence to ground. The circuit through relay coil 32 is completed from its opposite end through a lead 84 to a right contact 85 of a limit switch to the left contact 86 of the limit switch, lead 87, right contact 88 of a snap action switch, arm 72 of said switch, and thence to ground.

Limit switch 61 has a left contact 66 which has a depending portion 62. The arm 72 of the snap action switch has a depending portion 73. The arm 65 of the right snap action switch has a depending portion 67. The limit switch shown at the right has a contact 85 having a depending portion 89. The depending portions 62 and 73 are in the path of movement of a follow-up member 91. The depending portions 67 and 89 are in the path of movement of a follow-up member 90. The portions 89, 62 are engaged by members 90, 91 only when the respective rudders have reached maximum open position. The member 90 is driven through a mechanical connection 92 from the output shaft 20 of servomotor 30. The follow-up member 91 is driven through a mechanical connection 93 from the output shaft 21 of servomotor 31.

Figure 4:
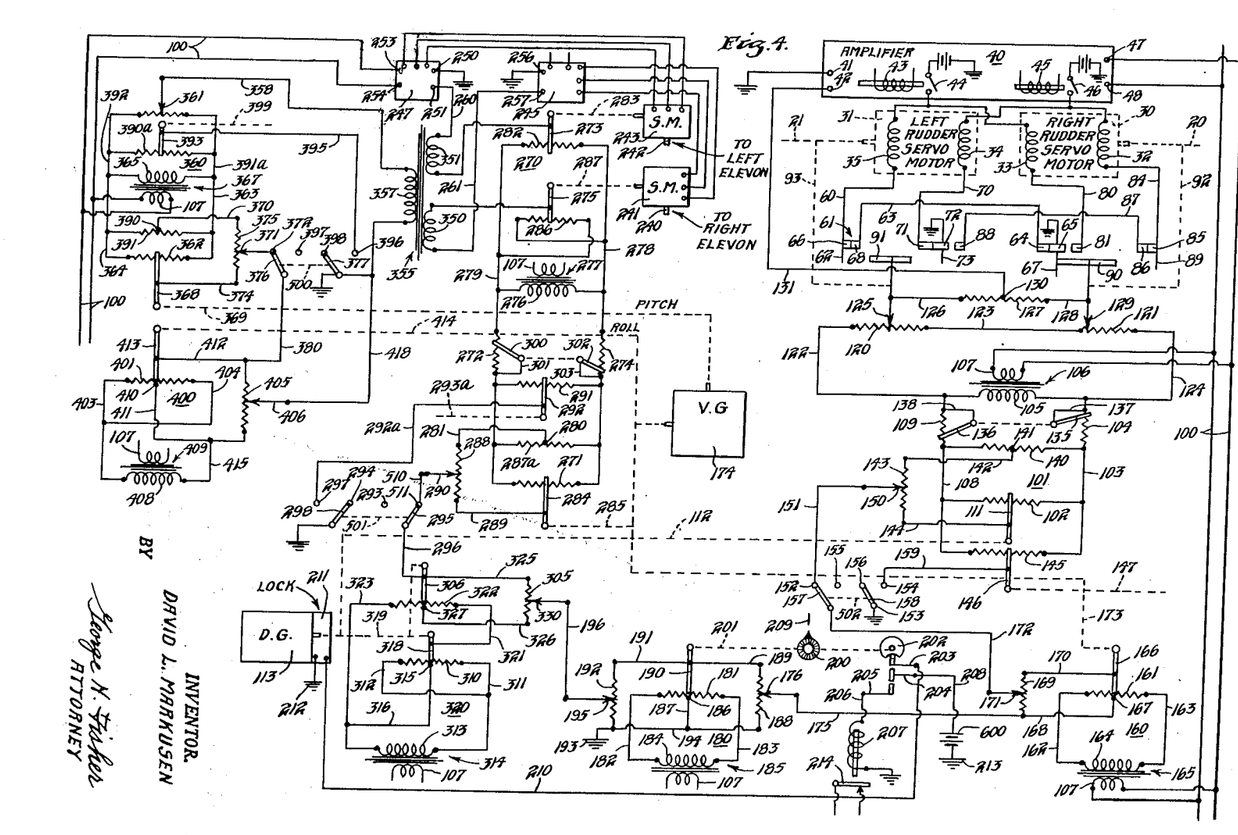
Figure 4 is a schematic arrangement of a control means for the autopilot.

The member 90 may assume two extreme positions. In one it actuates the depending portion 67 to engage contacts 64 and 65 against the biasing action of the blade supporting contact 65, which biasing action tends to cause engagement of contacts 65 and 81. In the other extreme position, the member 90 will engage depending portion 89 and separate contacts 85 and 86 in opposition to the biasing action of the switch arm which supports contact 85. The member 91 may assume two extreme positions. In one such position, the right end of member 91 engages the depending portions 73 of arm 72 and moves its contact into engagement with contact 88 in opposition to the biasing action of arm 72 which normally forces its contact against contact 71. In the other extreme position the movable member 91 has its left edge engaging the depending portion 62 to separate contacts 66 and 68 against the biasing action of the arm supporting contact 66 which normally forces contact 66 against contact 68. As illustrated in Figure 4, the movable member 91 has been moved from its extreme right position toward the left. At this time the left rudder is in a partly operated position. Ordinarily members 90 and 91 engage portions 67 and 73 to close contacts 64, 65 and 72, 88.

The operation of the amplifier servomotor arrangement may be briefly covered with reference to Figure 4. In Figure 4 the left rudder is in partly operated position which is attained by operation of a centering means described subsequently. Such partial operation has been made to clearly illustrate the function of the interrelated contacts. Normally contacts 72, 83 and 64, 65 are closed. Assume that a signal is applied to input terminals 41 and 42 of such phase with respect to the voltage across terminals 47 and 48 as to cause energization of relay 43 in amplifier 40 which results in the closing of switch 44. The closing of switch 44 in effect means that it is desired to turn the plane in the left direction.

A turning action may be effected by decreasing the resistance on one wing or increasing it on the other. This invention accomplishes turning by keeping the resistance of the wing in flight at a minimum. To further this purpose the wing on the outside of a turn has its resistance reduced to a minimum before a turn is initiated. Its rudder is therefore in closed position.

The closing of switch 44 aforesaid completes a circuit through relay 33 only as far as contact 81 as shown in Figure 4, at which point the circuit is open between contacts 81 and 65. The right servomotor relay is therefore not energized. However, closure of switch 44 does complete a circuit through relay coil 35 through lead 60, contacts 66, 68, lead 63, contact 64, and arm 67 to ground. The left rudder servomotor therefore operates its rudder and its follow-up means 91. We may assume that relay 43 of amplifier 40 when operated calls for more left rudder or more left wing drag or its equivalent and that relay coil 45 in amplifier 40 when energized calls for more right wing drag or turn to the right. It can now be seen that servomotor 31 drives its rudder 15 through output shaft 21. In ordinary operation the amount of movement given to the follow-up member is dependent upon the magnitude of the amplifier control signal which is derived from networks to be described. A left control signal is canceled by the follow-up adjustment of wiper 125. It is only in unusual instances that wiper 125 is moved to its extreme left position or until such time as follow-up connection 93 moves the follow-up member 91 to separate contacts 66 and 68. When contacts 66 and 68 are separated, relay coil 35 is deenergized. While the member 91 is being operated from its servomotor, member 90 remains in its leftward position during which time the right rudder is in unoperated position. Assume now that it is desired to stop the turning of the airplane to the left after member 91 has separated contacts 66 and 68. To stop the left turning action, relay 45 is energized to switch 46. Relay coil 32 which is connected to one pole of switch 46 has its circuit open between contacts 72 and 88. However, coil 34 which is also connected to a pole of switch 46 has its circuit completed through lead 70, contact 71, and pole 72 to ground. Motor 30 remains inoperative, but motor 31 is operative to drive its output shaft 21. Coil 34 causes the operation of shaft 21 in an opposite direction from that obtained by coil 35. Servomotor 31 therefore drives the rudder 15 toward closing position and at the same time drives its follow-up member 91 toward the right. When the member 91 reaches its rightward position, it separates contacts 71 and 72 thereby deenergizing coil 34 and closes contacts 72 and 88. If coil 45 remains energized, upon such closing of contact 72 and 88, a circuit is completed through coil 32, this circuit leading from switch 46, coil 32, lead 84, contacts 85, 86, lead 87, contact 88, and arm 72 to ground. Upon energizing coil 32, the right rudder is moved toward open position. When the right rudder 15 moves to open position, it increases the drag on the right wing, thereby tending to cause the aircraft to turn to the right. When the right wing rudder 15 is in operated position, the left wing rudder is in unoperated position. It is evident, therefore, that only one rudder is operated at a time.

It may be seen that if it is now desired to close the right rudder, the energization of relay 43 of amplifier 40 must be effected. Relay 43 closes switch 44. Switch 44 controls coils 35 and 33. The circuit through coil 35 is broken at contacts 64 and 65 due to the fact that follow-up member 90 is at the extreme right when the right rudder is fully operated. The circuit through coil 33 is closed through lead 80, contacts 81 and 65 to ground. The right wing servomotor 30 therefore operates in the reverse direction to close its rudder members 15 and to move its follow-up member toward the left. Servomotor 30 may continue to operate its shaft 20 until the member 90 reaches its extreme left position. At this time, the circuit for relay coil 33 is open at contacts 81 and 65. If coil 43 is deenergized at this time, switch 44 will open and both rudders will be in unoperated position. Switches 44 and 46 may be of the spring loaded type which have their arms normally biased toward open position, such biasing means not being shown.

The control signal input for amplifier 40 across terminals 41 and 42 is derived from a group of connected impedance networks 101, 160, and 180 by means of a circuit comprising terminal 42 of amplifier 40, lead 131, network 101, lead 151, a contact 152, a switch arm 157, lead 172, network 160, lead 175, network 180, ground 193, and back to the grounded side 41 of amplifier 40.

The impedance network 101 is in the form of an impedance bridge. Two legs of this bridge are formed by a resistor 102. One end of resistor 102 is connected through a lead 103 and a resistor 104 to one end of a secondary 105 of a transformer 106. The primary of the transformer is indicated at 107. Since the secondary windings of the transformers for other impedance networks may have a common primary winding, the reference character 107 is used in each case to indicate the primary winding. The other end of resistor 102 is connected through a lead 108 and resistor 109 to the other end of the secondary 105. Wiper 111 may engage the surface of resistor 102 and is adjusted therealong by a directional gyro 113 through a mechanical connection 112. The directional gyro 113 may be of any conventional type. One suitable type is that disclosed in application Serial No. 447,989, filed June 22, 1942. The other two legs of the bridge are formed by resistors 120 and 121. One end of resistor 120 is connected through a lead 122 to one end of secondary 105. The other end of resistor 120 is connected through a lead 123 to one end of resistor 121. The other end of resistor 121 is connected through lead 124 to secondary 105. Wiper 125 engages the surface of resistor 120. Wiper 125 is connected through a lead 126 to one end of a resistor 127. The other end of resistor 127 is connected through a lead 128 to a wiper 129 which engages the surface of resistor 121. Wiper 125 forms a portion of the follow-up means 31 operated by a servomotor 31. Wiper 129 forms a portion of the follow-up mechanism operated by servomotor 30. Resistor 127 has its center tap 130 connected through a lead 131 to input terminal 42 of amplifier 40. The resistors 104 and 109 which are connected between the ends of resistor 102 and secondary 105 have adjustable wipers 135 and 136 which are connected together so as to move simultaneously in opposite directions. These wipers 135 and 136 with their respective connections 137 and 138 are used to shunt a portion of their respective resistors 104 and 109. These resistors with their wipers are termed the centering means. The function of the centering means is to manually modify the position of either rudder. We may assume that in a given condition there is no potential difference between wiper 111 and contact 130 of resistor 127. Suppose at a particular time the left end of secondary winding 105 is at a positive potential. If under the conditions assumed the centering wipers 136 and 135 are moved clockwise it may be seen that the potential of wiper 111 is increased due to the fact that the resistance between wiper 111 and the left end of the secondary winding 105 has been decreased. A difference of potential between wiper 111 and the tap 130 will now exist. In order to raise the potential of tap 130 it will be necessary to move wiper 125 to the left. Moving wiper 125 leftward increases the potential of tap 130 and such adjustment may be made until there is no difference of potential between wiper 111 and tap 130. The movement of wiper 125 is obtained from member 91. Member 91 is driven from a left rudder servomotor. The left rudder servomotor also operates the left rudder consequently in obtaining the balance between the potentials of wiper 111 and tap 130 we have adjusted or changed the position of the left rudder. If it were desired that the position of the right rudder were changed the centering means would have been moved in the opposite direction from that given for the adjustment of the left rudder. In Figure 4 the centering means had been adjusted to provide an arrangement so that the left rudder is normally carried in a partly open position.

A resistor 140 is connected across the ends of secondary 105. A connection 142 leads from the center tap 141 of resistor 140 to one end of a resistor 143. The opposite end of resistor 143 is connected by means of lead 144 to wiper 111. A wiper 150 may be positioned along the surface of resistor 143. A resistor 145 is also connected across the ends of secondary 105 of the transformer. A wiper 146 may be positioned over the surface of resistor 145. This wiper 146 may be moved through a mechanical connection 147 by the rudder bar (not shown) of the aircraft.

In impedance network 101, the center tap 130 of resistor 127, the center tap 141 of resistor 140, the wiper 111, and the wiper 146 are normally at the same potential. The resistor 127 is connected to wipers 125 and 129. If wiper 111 be moved to the left to thereby raise its potential with respect to center tap 130, the wiper 125 may be moved to the left over resistor 120 to raise the potential of center tap 130 so that there is no difference of potential between the center tap 130 and wiper 111. If wiper 111 had, on the other hand, been moved to the right to raise its potential, the wiper 129 could have been moved to the right over resistor 121 to raise the potential of center tap 130 since wiper 129 is connected through lead 128 to resistor 127. The wipers 125 and 129 are operatively connected to their respective servomotors 31 and 30 through connections 93 and 92. If wiper 111 be moved to the left to raise its potential with respect to center tap 130 of resistor 127, such difference of potential is applied on the one hand to input 42 and on the other hand through impedance networks 160, 180 to ground 193 and to the grounded side 41 of amplifier 40. With wiper 111 in this position, the phase of the voltage applied to terminals 141 and 142 is such that relay 43 is energized, and as shown the left servomotor 31 is effective to move the wiper 125 to the left to raise the potential of center tap 130 until it is the same as that of wiper 111. It should be noted that the potential on wiper 125 is applied to one end of resistor 127 and the potential of wiper 129 is applied to the other end of resistor 127. The center tap 130 is therefore at the average potential between the wipers 125 and 129. When wipers 125, 129 are at their innermost or central position, the potential of wiper 125 is the same as wiper 129 and center tap 130 is at the same potential as center tap 141 of resistor 140. Since center tap 130 is at the average potential between wipers 125 and 129, its potential may be raised or lowered by the movement of either wiper 125 or 129. For example, assume that wiper 125 is at its extreme right position and wiper 129 is in its extreme right position. Assume that in a given half cycle of the line voltage the left end of secondary 105 is positive with respect to its right end. If wiper 111 be moved to the left to raise its potential with respect to center tap 141, the potential of center tap 130 may be raised either by moving wiper 129 to the left, through its servomotor 30, away from the negative end of secondary 105 or the potential of center tap 130 may be raised by moving wiper 125, through its servomotor 31, to the left where it is near the positive end of secondary 105. Wiper 129 in this particular case may be moved until center tap 130 is at the same potential as wiper 111. In the particular arrangement it was necessary to move wiper 129 since its servomotor 30 through its coil 33 was operative when switch 44 was closed whereas the servomotor 31 for moving wiper 125 was inoperative since the circuit through its coil 35 was open at contacts 64, 65. It is therefore seen that any voltage arising out of difference of potential between wiper 111 and center tap 130 is offset by an equal and balancing voltage arising out of the movement of the servomotors 31 and 30. The servomotors 31 and 30 are thus operated an amount proportional to the movement of wiper 111 and do not normally move so as to operate either of the extreme limit switches.

A connection 151 extends from wiper 150 of network 101 to a contact 152 of a double pole double throw switch. A connection 153 leads from wiper 146 to a contact 154 of this double pole double throw switch. This switch has two additional contacts 155 and 156. Switch arm 157 which may engage contact 152 or 155 is connected through a lead 172 to a wiper 171. The other switch arm 158 which may engage contact 154 or 156 is connected to ground. Thus it is apparent that network 101 may be alternatively, automatically or manually controlled.

The lead 172 connects to wiper 171 of a rudder resetting and compensation impedance network 160. This impedance network 160 is in the form of a double potentiometer arrangement. One potentiometer consists of a resistor 161 and a wiper 166 which engages its surface. Movement of wiper 166 is derived from a vertical gyro 174 through a mechanical connection 173. The vertical gyro 174 may be of the type disclosed in the aforementioned application Serial No. 447,989, filed June 22, 1942. The ends of resistor 161 are connected by means of leads 162 and 163 to the ends of a secondary 164 of a transformer 165. The primary of the transformer 165, as usual, is indicated at 107. The resistor 161 has a center tap 167 which is connected through lead 168 to one end of resistor 169. The other end of resistor 169 is connected through lead 170 to the wiper 166. Resistor 169 and wiper 171 form a second potentiometer. Wiper 166 may be moved with respect to the center tap 167 to select voltages either positive or negative during any given half-cycle, depending on the direction of movement of wiper 166 with respect to the center tap 167. The voltage selected by wiper 166 is fed across resistor 169, and wiper 171 may select any desired portion of this voltage since it may be positioned along resistor 169.

One end of resistor 169 is connected through lead 175 to a wiper 176 of a manual turn impedance network 180. Network 180 comprises a resistor 181 whose ends are connected to the ends of the secondary 184 of a transformer 185 whose primary is indicated by reference numeral 107. A wiper 190 may be positioned along the surface of resistor 181. The resistor 181 has a center tap 186. Two resistors are symmetrically connected across wiper 190 and center tap 186. In one case, a resistor 188 has one end connected through a lead 189 to wiper 190. Leads 194 and 187 connect the other end of the resistor 188 to the center tap 186. The other resistor 192 has one end thereof connected through lead 191 to wiper 190. The other end of resistor 192 is connected through leads 194, 187, to the center tap 186 of resistor 181. The wire 194 is connected to ground at 193. Wiper 190 may be positioned along resistor 181 in either direction from the center tap 186 to pick up positive or negative voltages with respect to the voltage of the center tap 186. Such voltage picked up by wiper 190 is applied across resistors 188 and 192. Wiper 176 may be positioned over resistor 188 to select any portion of the voltage picked up by wiper 190. The voltage so selected by wiper 176 of network 180 is applied in series with the voltage selected by wiper 171 with respect to its center tap 167 of impedance network 160. These two voltages which are in series are then fed through lead 172, switch arm 157, contact 152, to wiper 150 of impedance network 101.

In impedance network 101, wiper 111 and center tap 141 of resistor 140 are normally at the same potential. Wiper 111 may be moved over the surface of 102 in either direction to increase or decrease its potential with respect to center tap 141. Such difference of potential between wiper 111 and center tap 141 is applied across the resistor 143. Normally, the potential of center tap 130 of resistor 127 is the same as the potential of center tap 141 of resistor 140. The center tap 130 is connected to the input side 42 of amplifier 40. The potential between wiper 111 and center tap 141 of resistor 140 is normally the same as the potential between wiper 111 and center tap 130 of resistor 127 or the input 42 of amplifier 40. Such difference of potential is applied to the ends of resistor 143 and wiper 150 may select any desired portion of this difference of potential. Such difference of potential as selected by wiper 150 is in series with the potential from impedance networks 160 and 180. It is therefore seen that a voltage signal arising out of any impedance network is transmitted to the amplifier input 42. The grounded side 41 of the amplifier 40 is common with the ground 193 of the impedance networks 180, 160, and 101.

Wiper 190 of impedance network 180 may be adjusted over the surface of resistor 181 by a manual turn control means 200 which is mechanically connected by means 201 to wiper 190. Turn control means 200 may be rotated in either direction. A reference line 299 is used to position the turn control means in normal position. The mechanical connection 201 of turn control 200 also drives a cam 202. This cam has a circular portion and a depressed portion, as shown. The cam 202 may be adjusted to operate three contact bearing spring arms 203, 204, and 205 whose contacts are normally separated. When cam 202 is rotated, it cams the upper arm 203 to cause the contacts on the arms 203, 204, and 205 to become engaged.

When contact arms 203, 204, and 205 are so engaged, a circuit is completed from battery 600, lead 208, contacts of arms 203, 204, lead 210, lock 211 of the directional gyro 113, ground 212, and ground 213 of battery 600. This lock may be of the type disclosed in application Serial No. 447,989, filed June 22, 1942. The lock 211 is arranged between the output member of a directional gyro and the means operated by this output member. Motion of the directional gyro is transmitted through a member to a control means by a friction clutch, not shown. When lock 211 is energized it holds the control side of the friction clutch, but the other side which is driven by the directional gyro is permitted to move.

The lower contact of spring arm 204 engages an upper contact on spring arm 205 when cam 202 is operated to complete a circuit from battery 600, lead 203, contacts of spring arms 204, 205, lead 206, electromagnet 207 to ground and return to ground 213 of battery 600. When electromagnet 207 is energized, it moves switch arm 214 to open the circuit for the erecting means of vertical gyro 174 similarly to that disclosed in application Serial No. 447,989, filed June 22, 1942. The electromagnet 207 and switch arm 214 are termed the erection cut-out for the vertical gyro 174. The erection means for the vertical gyro 174 maintains its rotor axis perpendicular to the earth but it is necessary to cut out the erection means while the aircraft is in a turn to prevent false erection due to centrifugal force.

The elevons are mounted upon shafts, not shown. The right elevon is operated by a servomotor 241 through its output shaft 240. The left elevon is operated by a servomotor 243 through its output shaft 242. Servomotors 241 and 243 may be of the type disclosed in the above mentioned application Serial No. 447,989, filed June 22, 1942. The right elevon servomotor 241 is controlled by an amplifier 245. The left elevon servomotor 243 is controlled from an amplifier 247. Amplifiers 245, 247 are similar to amplifier 40. The direction of rotation of the output shafts 240, 242 of the respective servomotors 241, 243 depends upon and varies with the phase relationship of the control input voltage to the amplifiers 245 and 247 with respect to that of a line voltage. For example, the control input terminals of amplifier 247 are indicated at 250 and 251. The amplifier 247 is supplied with voltage applied across terminals 253 and 254 from a source of voltage 100 which may be the inverter of the aircraft electrical system. If the control input signal applied across terminals 250 and 251 is of the same phase as the voltage supplied across terminals 253 and 254, the servomotor 243 will rotate its output shaft 242 in one direction. On the other hand, if the phase of the input signal across terminals 250 and 251 is opposite to that supplied across terminals 253 and 254, the servomotor 243 will rotate its output shaft 242 in an opposite direction. The elevons which are normally streamlined with respect to the surface of the wing may therefore be moved by their servomotors 241, 243 either to a position above the wing or below the wing.

Amplifiers 245 and 247 are controlled by input control signals obtained from a group of connected impedance networks 270, 320, and 180. The input circuit of amplifier 247 is as follows: from input signal terminal 251 through lead 260, coil 351, impedance network 270, switch arm 295, lead 296, impedance network 320, lead 196, wiper 195, network 180, and ground 193, to grounded terminal 259 of amplifier 247.

Amplifier 245 is controlled from an input signal derived from input terminal 257, lead 261, coil 350, wiper 275, impedance network 270, lead 510, switch arm 295, lead 296, network 320, lead 196, wiper 195, network 180, ground 193 and to grounded terminal 256 of amplifier 245.

Impedance network 270 comprises a resistor 271 having its ends connected through resistors 272, 274 to the respective ends of secondary 276 of transformer 277 having a primary 107. The ends of secondary 276 are also connected through leads 278, 279 to the respective ends of resistor 282. A wiper 273 may be positioned over the surface of resistor 282. This wiper is driven from servomotor 243 through a mechanical coupling 283. The surface of resistor 271 may be contacted by a movable wiper 284 whose motion is derived from a vertical gyro 174 through a mechanical connection 285. A resistor 286 whose surface may be engaged by wiper 275 is reversibly connected across the ends of secondary 276 as shown. The wiper 275 is driven from the right servomotor 241 by means of a mechanical connection 287. A resistor 291 is placed in parallel to resistor 271 across secondary 276. A wiper 292 may engage the surface of resistor 291. The wiper 292 may be positioned from a manual control stick (not shown) through a mechanical connection 293a. This stick is of the conventional type, and movement in the conventional aileron control manner operates the wiper 292.

Resistor 272 which connects resistor 271 with one end of secondary 276 has a wiper 300 and lead 301 for shunting a portion of this resistor. Similarly, resistor 274 has a wiper 302 connected to a lead 303 whereby portions of resistor 274 may be shunted. Wipers 300 and 302 are mechanically connected so as to operate together. The resistors and wiper constitute the centering means for network 270.

A resistor 287a is also placed in parallel to resistor 271 across secondary 276. Resistor 287a has a center tap 280 connected through a lead 281 to one end of a resistor 288. The other end of resistor 288 is connected through a lead 289 to wiper 284 which bears on the surface of resistor 271. A wiper 290 may be positioned along the surface of resistor 288 to select any portion of the voltage between wiper 284 and center tap 280. Wiper 290 is connected through a lead 510 to a terminal 511 of a double pole double throw switch. Reference characters 293, 294, and 297 indicate the other contacts of the switch. Switch arms 295 and 296 have their respective pivot points connected to lead 296 and to ground, respectively. Lead 296 connects the switch arm 295 with a wiper 306 of a coordinated turn impedance network 320.

Impedance network 320 comprises three potentiometers. Resistor 310 of the first potentiometer has its ends connected through leads 311, 312 to a common end of a secondary 313 of a transformer 314 having a primary 107. The resistor 310 has a center tap 315 connected through a lead 316 to the other end of secondary 313. A wiper 318 may contact the surface of resistor 310. The motion of wiper 318 is derived from a directional gyro 113 by means of a mechanical connection 319. Wiper 318 is connected through a lead 321 to one end of a resistor 322. The other end of resistor 322 is connected through a lead 323 to lead 316 and thence to one end of secondary 313. A lead 325 connects wiper 306 to one end of resistor 305. The lead 326 connects the other end of resistor 305 to a center tap 327 of resistor 322. A wiper 330 may be positioned along the surface of resistor 305. The wiper 330 is connected through lead 196 to wiper 195 of impedance network 180. The wiper 306 is operated concomitantly with wiper 318 through the mechanical connection 319 from directional gyro 113. It may be seen that the resistor 310 of impedance network 320 has both of its ends connected to the same side of secondary 313 and its center tap is connected to the other end of secondary 313. Wiper 318 may be moved in either direction with respect to center tap 315 of resistor 310. Therefore, for either direction of movement of wiper 318 its potential with respect to the center tap is of the same phase.

The potential between wiper 318 and center tap 315 is applied across the ends of resistor 322. A center tap 327 of resistor 322 is connected through lead 326 to one end of resistor 305. Wiper 306, which is concomitantly moved with wiper 318 is connected to the other end of resistor 305 through lead 325. The potential between wiper 306 and center tap 327 is thereby applied across the ends of resistor 305. The voltage selected by wiper 306 with respect to center tap 327 is not merely proportional to the movement of wiper 306 through its connection 319 from directional gyro 113 but is also a function of the voltage applied across resistor 322. This voltage applied to resistor 322, in turn, varies with the movement of directional gyro 113. The voltage between wiper 306 and center tap 327 is thus not a linear function of the movement of gyro 113 but is a higher derivative of such movement. The wiper 330 may be adjusted over resistor 305 to select any desired portion of the voltage drop between wiper 306 and center tap 327.

The purpose in connecting one end of resistor 305 to the center tap 327 of resistor 322 and having its other end connected to wiper 306 may be clarified from considering the operation of the network. The operation of the rudders will be omitted at this time. The network 320 is to provide a signal which is to effect operation of the elevons in opposite directions or as ailerons. Assume in a half cycle that the right end of secondary 313 is positive with regard to its left end. Assume also that the plane is off course in such a direction as to cause the directional gyro 113 to move the wipers 318, 306, to the right. In this case, the right end of resistor 322 is positive with respect to the center tap and wiper 306 will select a potential which is positive with respect to its center tap 327. This signal may be applied through lead 296 to effect control of the elevons as ailerons to bank the aircraft in an effort to bring the aircraft back on the desired course. Assume, on the other hand, that the right end of secondary 313 is positive with respect to its left end, but assume that the craft changes its heading so as to cause the directional gyro to move wipers 318 and 306 to the left. Wiper 318 even though moved to the left again has a higher potential than center tap 315 and will apply a positive voltage to the right end of resistor 322 with respect to the other end of resistor 322. The voltage selected by wiper 306 since it is moved to the left of the center tap is negative with respect to the center tap 327. Therefore, an opposite signal is set up from that derived in the first case. This signal will result in the application of opposite aileron from the first case. This is logical since the deviation has been in a direction opposite from that in the first case, and it would be desirable to bank the plane in an opposite direction from that obtained in the first case.

Network 180 is associated with the control of the elevons as ailerons in a similar manner to that in which it is associated with the control of the rudder. That is, operation of the turn control 200 may displace wiper 190 in either direction to select a voltage with respect to center tap 186. Such difference of potential is applied across the ends of resistor 192 and a portion of this may be selected by wiper 195. Such voltage selected between 195 and ground 193 is applied in series to the voltage set up on resistor 305 between wiper 330 and the end of resistor 305 connected to lead 325. In normal operation when the turn control 200 is operated, the lock 211 prevents movement of wipers 306, 318 and no signal is derived from network 320. The voltages thus added are applied through lead 296 to switch arm 295 and contact 292 to wiper 290 of impedance network 270. The voltage thus applied to wiper 290 with network 270 in a balanced condition alters equally the potential of all points on network 270. Such potentials are therefore transmitted through network 270 through wiper 273, secondary winding 351, and lead 260 to input terminal 251 of amplifier 247 on the one hand and through wiper 275, secondary winding 350, lead 261, and to input terminal 257 of amplifier 245 on the other hand. The amplifiers will therefore become conducting. The amplifiers 245 and 247 are so related to their respective servomotors 241 and 243 that even though the amplifiers 245 and 247 as thus arranged receive the same input signal, the servomotor shafts 240 and 242 are rotated in opposite directions to secure the aileron action of the elevons.

The servomotors 241 and 243 when energized operate their follow-up members 287 and 283, respectively, to position wipers 275 and 273. It should be noted that resistor 286 is connected across secondary 276 in an opposite arrangement from that of resistor 282. This is necessary because its wiper 275 as driven by follow-up member 287 must set up an equal and opposing voltage to that which initiates the operation of its servomotor. Therefore, if wiper 273 moves to the left to set up an equal and opposing voltage to that which initiated the operation of its amplifier 247, the wiper 275 must in effect move in a direction to change its potential by the same amount as wipers 273 has its potential changed. Since the servomotor shafts operate in opposite directions, and wiper 275 would move to the right if wiper 273 moved to the left, the right end of resistor 286 must be connected to the same end of secondary 276 to which the left end of resistor 282 is connected.

The amplifiers 245 and 247 are also controlled to effect the operation of the elevons through their respective servomotors 241 and 243 of such nature that the elevons move together in the same direction as conventional elevators. To effect such control, amplifiers 245 and 247 are connected respectively to secondary coils 350 and 351 of a transformer 355 whose primary is indicated at 357. The primary 357 is energized from its control impedance networks 360 and 400. One side of the primary 357 is connected through a lead 358 to a wiper 361 of pitch axis deviations controlled impedance network 360. From here the control circuit for amplifiers 245, 247 is completed through impedance network 360, a wiper 371, contact 372, switch arm 376, lead 380, impedance network 400, and lead 418 to the other end of primary 357. The impedance network 360 comprises a resistor 362 which has its respective ends connected through leads 363, 364, to the ends of a secondary 365 of a transformer 367 whose primary is indicated at 107. A wiper 368 engages the surface of resistor 362. This wiper 368 derives its movement from the vertical gyro 174 through an operative connection 369. The connection 369 partakes of the movement of the vertical gyro 174 resulting from movement of the plane about its pitch axis. Wiper 368 is connected through a lead 374 to one end of resistor 375. The opposite end of the resistor is connected through a lead 370 to a center tap 390 of a resistor 391. The wiper 371 engages resistor 375 and is manually adjustable with respect thereto. The resistor 391 has its ends connected across the secondary 365 of transformer 367 through leads 363 and 364. An additional resistor 390a is connected across the ends of secondary 365 through leads 391a, 392. A wiper 393 may be positioned along the surface of resistor 390a. Wiper 393 is connected through an operative connection 399 to the conventional control stick (not shown) of the aircraft. The fore and aft movement of this stick effects the movement of wiper 393. Lead 395 extends from wiper 393a to a contact 396 of a double pole double throw switch. The remaining contacts of the switch are 397, 398, and 372. A switch arm 376 may engage either contact 372 or 397. A lead extends from the switch arm to one end of a resistor 405 of a compensating up elevator-impedance network 400. The other switch arm 377 is connected to ground and also to one end of primary 357. The wiper 361 may be manually adjusted to balance or unbalance network 360. It serves as a centering means for the elevons.

Impedance network 400 comprises a resistor 401 which has its ends connected through leads 403 and 404, to a common end of a secondary 408 of a transformer 409 having a primary 187. The resistor 401 has a center tap 410 connected through lead 411 to one end of the resistor 405. The other end of the resistor 405 is connected through lead 412 to wiper 413. Wiper 413 may be positioned over the surface of resistor 401. Wiper 413 is actuated through an operative connection 414 by the vertical gyro 174. The actuation of wiper 413 is obtained from gyro 174 which responds to the movement of the plane about its roll axis. A lead 415 forms a junction with lead 411 to connect the center tap of resistor 401 to the other end of the secondary 408 from that to which the ends of the resistor 401 are connected. It may be seen that in any half cycle the wiper 413, although moved in either direction with respect to its center tap 410, always selects a voltage of the same polarity since the ends of resistor 401 are connected to a common source of potential. If wiper 413 be positioned with respect to its center tap 410 to select a voltage, this voltage is applied across resistor 405. Wiper 406 may be positioned along resistor 405 to select any portion of this voltage selected by wiper 413. This voltage is applied from wiper 406 through lead 418 to the primary 357. The circuit is completed through network 360, lead 370, resistor 375, wiper 371, contact 372 switch arm 376, lead 380, to the other end of resistor 405. The primary 357 as thus energized thereby energizes secondaries 351 and 350 to cause their respective amplifiers 245 and 247 to operate. The networks 360 and 400 are to effect the control of elevons as elevators.

It may be recalled that servomotors 241 and 243 operate in reverse directions for the same signal applied to their amplifiers 245 and 247. Therefore, in order that the servomotors 241, 243 rotate their output shafts 240 and 242 in the same direction for elevator operation of the elevons, it is necessary to couple one secondary coil 351 to its primary 357 in a reverse manner from that in which the other secondary is coupled. For this purpose the lower end of secondary 350 is connected to the input terminal 257 of amplifier 245 whereas secondary 351 has its upper terminal connected to the input terminal 251 of amplifier 247. By this circuit arrangement, the servomotors 241 and 243 will rotate their output shafts 240 and 242 to move the elevons in the same direction.

The same follow-up means 287 of servomotor 241 and follow-up 283 of servomotor 243 operate respective wipers 275 and 273 to set up in series with the respective secondary coils 350 and 351 balancing voltages equal and opposed to that supplied from primary 357. For example, assume in a half cycle that the upper end of secondary 351 is positive with respect to its lower end at the time that networks 270, 310, and 180 are in balanced condition. The resultant operation of the servomotor 243 will, through its follow-up means 283, effect the positioning of wiper 273 so that it is negative with respect to center tap 280 of resistor 287 which center tap is connected through network 320, 180 to the grounded terminal 250 of amplifier 247. Since wiper 273 being connected thereto is at the same potential as the lower end of secondary 351, the grounded terminal 250 is at a higher potential than the lower end of secondary 351. The amount that the potential of terminal 250 is above the potential of the lower end of secondary 351 depends upon the movement given to wiper 273. Eventually, a point is reached where the terminal 250 and the terminal 251 of amplifier 247 have the same potential with respect to the lower end of secondary 351 at which time the amplifier 247 no longer operates.

It may be seen that the double pole double throw switches 500, 501, and 502, when moved to an opposite position from that in which they are illustrated in Figure 4, serve to transfer control of the networks to the manually operated rudder bar and the flight control stick (not shown). In network 360, the operation of the control stick by the pilot will move, through its connection 394, wiper 393. The movement of wiper 393 enables it to select a voltage with respect to slider 361. Wiper 393 is connected through lead 395, terminal 396, switch arm 377, to one end of primary 357. The other end of primary 357 is connected through lead 358 to wiper 361. This signal resulting from the movement of wiper 393 is applied to the primary 357 to cause it to energive the secondaries 350 and 351. The secondaries 350, 351 in turn operate their amplifiers 245 and 247 to effect operation of the servomotors 241, 243. The servomotors actuate their output shafts 240 and 242 to effect movement of the elevons in the same direction. Similarly, movement of the control stick of the plan athwartships effects movement of wiper 292 by means of the connection 293a. Wiper 292 when thus moved selects a potential with respect to center tap 280 of resistor 287. This potential is applied through lead 292a to contact 297, switch arm 298, to ground and to the amplifier ground terminals 250 and 256. The other input terminals 251, 257 of the amplifiers 247, 245 are connected on the one hand through lead 260, and secondary winding 351 to wiper 273 and on the other hand through terminal 257, lead 261, and secondary winding 350 to wiper 275. At this time, the wipers 273 and 275 being centered are at the same potential as the center tap 280 of resistor 287. A signal is thus applied to amplifiers 245 and 247 to cause the operation of servomotors 241 and 243 to drive their output shafts 240 and 242 in opposite directions to position the elevons in opposite directions. The operation of the servomotors 241 and 243 positions the follow-up connections 283 and 287 to position the wipers 273 and 275 with respect to their center positions to set up an equal and opposing voltage on their respective amplifiers to that set up by the movement of wiper 292. No control signal is applied to amplifiers 245, 247 and they cease controlling their servomotors 241, 243.

When double pole double throw switch 502 is thrown to the right from the position shown in Figure 4, movement of the rudder bar, not shown, causes movement of wiper 146 through the operative connection 147 to select a voltage with respect to center tap 141 of resistor 140. This signal voltage selected by movement of wiper 146 is transmitted through lead 159, contact 154, switch arm 158, switch arm terminal 153 to ground and to the grounded terminal 41 of amplifier 40. At this time the rudders are considered as closed with wipers 125, 129 in the inner positions and the potential of center tap 130 of resistor 127 is the same as that of center tap 141 of resistor 140. Center tap 130 is connected to input terminal 42 of amplifier 40. The signal as thus applied to amplifier 40 causes the amplifier 40 to effect operation of one or the other of servomotors 31 and 30. These servomotors, when operating, position their respective rudders and also actuate their follow-up means 93 on the one hand and 92 on the other hand to position their follow-up wipers 125 or 129 to balance the voltage resulting from the movement of wiper 146.

*Operation*

Figure 3:
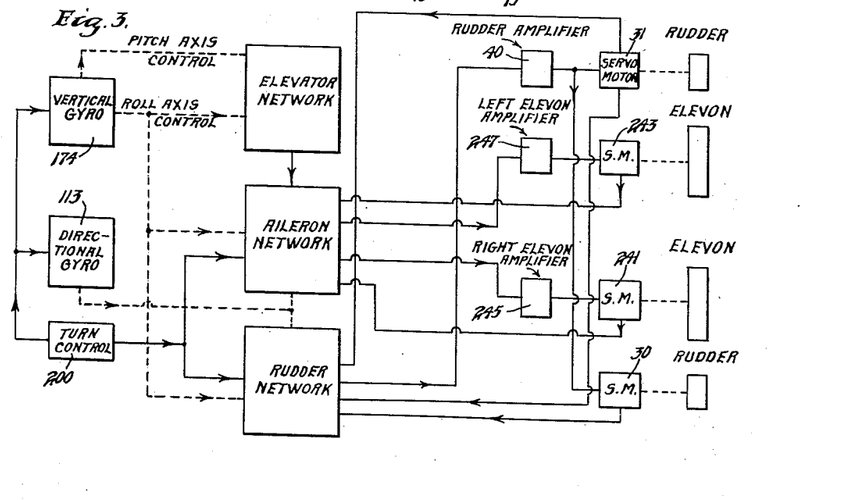
Figure 3 is a functional diagram of the autopilot system showing the relation between the control elements and the control surfaces of the aircraft.

The operation of the system will be recited with reference to Figure 4 and to the diagram shown in Figure 3. The operation of the system when control is effected by the manual turn control means 200 will be considered first. The operation of the turn control means effects operation of the directional arm lock 211 and also renders ineffective the erecting system for the vertical gyro 174. Turn control 200 also positions a wiper in network 180 to derive a signal for control of the rudder and a further signal for control of the elevons. The signal applied to the rudder control causes the operation of amplifier 40 which positions one or the other rudder, depending on the direction in which the turn is to be made. At the same time, a signal is applied to the elevon amplifiers 245 and 247 from the turn control impedance network 180, lead 196, network 320, lead 296, network 270, lead 260, to amplifier 247 on the one hand and through wiper 275, lead 361, and input terminal 257 of amplifier 245 on the other hand. This causes the servomotors to position their elevons in opposite directions. The plane turns and banks under the dual action of the rudder and ailerons. The banking of the airplane causes the vertical gyro 174 to set up control signals due to movement of the plane about the roll axis. These signals are sent to networks 400, 360 which may be termed the elevator networks; the networks 180, 320, and 270 which may be termed the aileron networks; and to networks 180, 160, 101 which may be termed the rudder networks. The elevator networks cause the operation of the elevon amplifiers 245 and 247 to move the elevons through their servomotor in the same directions. In other words, the elevons are given an up movement whenever the plane is in a turn. It is desirable to give up elevator in turns since the plane tends to lose altitude when in a turn and the application of elevator tends to correct for any tendency to lose altitude. The control signal derived from the vertical flight gyro 174 and applied to the aileron networks causes the amplifiers 245 and 247 to effect operation of their servomotors 241, 243 so that the elevons are moved toward normal position. In other words, the effect of this control signal in the aileron networks is to "wash out" the signal which was originally applied to this network through the operation of the turn control means 200.

The purpose in "washing out" the signal is clarified by the following explanation. When it is desired to place an aircraft in a particular angle of bank, it is necessary after that angle of bank is reached to move the control surfaces which obtain this bank toward their normal positions. Otherwise the plane will continue to bank.

Similarly, the control signal from the vertical gyro and applied to the rudder networks causes the amplifier 40 to effect operation of the servomotor 30 or 31 to move the rudder back to unoperated position. The purpose of applying rudder when making a turn is that the application of rudder along with aileron enables a plane to go into the turn more rapidly than if aileron alone were used to turn the plane. After the plane has started into its turn, the rudder may be placed in neutral position along with the ailerons or elevons, and the plane will continue to turn at the desired banking angle.

When it is desired to straighten out, the turn control 200 is moved back toward normal position. This sets up an opposite signal in the rudder and aileron networks. The rudder is moved in an opposite direction, as are also the ailerons or elevons. The movement of the elevons as ailerons causes the plane to lose some of its bank. This changes the amount of movement which vertical gyro 174 applies to the wiper 413 in the elevator network, the wiper 284 of the aileron network, and the wiper 146 of the rudder network. The resulting movement of these wipers in their respective networks again causes the movement of their control surfaces toward normal position. Continued movement of turn control 200 until it reaches normal position causes repeated application of opposite rudder and aileron and their re-centering by control signals coming from the vertical gyro 174. The action is continuous so that when the plane reaches level position the control surfaces are in neutral position and the respective networks are in balanced condition.

The operation may also be considered when the plane is in level flight and is being stabilized by the directional gyro 113 and the vertical gyro 174. If the aircraft deviates from its desired direction of flight, the directional gyro 113 sets up a control signal in the aileron networks and in the rudder networks. The rudder networks effect the operation of the servomotors to apply rudder. At the same time, the aileron networks apply a signal to their amplifiers to effect movement of the elevons as ailerons. The plane now moves toward its desired direction under the positioning of the elevons and rudder. The movement of the elevons as ailerons causes the plane to bank and thereupon causes the vertical gyro 174 to set up control signals in the elevator networks, the aileron networks, and the rudder networks. Again, the elevator network tends to apply up elevon to maintain the altitude of the aircraft. The aileron networks as controlled by the gyro 174 tend to restore the elevons to neutral position and the rudder networks restore the rudder to unoperated position. The plane flies toward its desired direction and in so doing the value of the deviation signal from the directional gyro 113 decreases. Since the signal is decreasing, the signal applied to the aileron and rudder networks causes the positioning of the elevons and rudder in a direction opposite from that originally given to them. The magnitude of the bank of the plane thereupon decreases. The vertical gyro responds to the lessening banking angle and effects the return of the rudder to neutral position and the elevons to neutral position and tends to cause the elevator network to restore the elevons toward neutral position. The action is continuous, lessening of the deviation signal being used to apply opposite rudder and aileron from that which it originally caused to be set up. Similarly, the vertical gyro responds to the lessening angle resulting from the opposite movement of the controls and tends to decrease the amount of up elevator and to restore the elevons through the aileron network and the rudder through the rudder network to zero position. Finally, as the plane reaches its desired heading, the rudders and elevons are in normal position and the networks are in a balanced condition.

The operation will be considered when the plane, due to an external disturbance, has a movement about its roll axis. The vertical gyro 174 responding to the movement of the plane about the roll axis, sets up a signal in the elevator network, the aileron network and the rudder network. The purpose of applying signal in the aileron network is to raise the wing which has been depressed. The purpose of operating the rudder is to prevent the plane from turning in the direction of the depressed wing. In other words, the rudder is operated to maintain the direction in which the plane is flying. The operation of the elevator networks is to provide up elevon to prevent the plane from losing altitude. As the plane tends to regain level flight, the magnitude of the signal from the vertical gyro 174 decreases to the various networks. As the value of the signal from vertical gyro 174 decreases, the elevator, aileron, and rudder networks effect control of their respective servo motors to drive their control surfaces in the opposite direction toward normal position. As the signal from the vertical gyro 174 decreases still further, the rudders and elevons are moved still more toward the normal position. When the plane regains level flight, the rudders and elevons are in normal position, and the networks are in balanced condition.

Movement of the plane about the pitch axis does not result in the aircraft having a tendency to turn as would a movement about the roll axis. The movement of the aircraft about the pitch axis causes the vertical gyro 174 to respond and set up a signal in the elevator network only to effect up or down elevon, as the case may be. As the plane in response to the movement given to the elevons moves toward level flight position, the value of the signal from the vertical gyro to the elevator networks decreases. This causes the movement of the elevons toward normal position. As the plane moves toward level flight, it eventually reaches a condition in which the networks are balanced, and the elevons are in unoperated position.

It can now be seen that this invention provides a novel flight control system for a tailless airplane in which two single control surfaces serve a dual function. In one they control the movement of the plane about the roll axis, and in the other they control the plane about the pitch axis. In these functions turn about the roll axis results in opposite movement of these control surfaces and turn about the pitch axis results from the same direction of movement of these control surfaces.

The novel flight control system also includes a new apparatus for controlling the movement of the plane about the turn axis by increasing or decreasing the resistance of a wing. With this arrangement maximum efficiency of flight is obtained by permitting only one wing resistance changing device to be placed in operated position at one time.

I claim:

1. In an automatic flight control system for an aircraft having two elevon control surfaces operable in the same or opposite directions, an individual operating means for each said control surfaces, means responsive to the tilt of the aircraft about an axis for oppositely controlling said operating means to move said elevons in opposite directions, and further means responsive to the tilt of the aircraft about said axis for similarly and additionally controlling said operating means to move said elevons in but one direction irrespective of said direction of tilt.

2. In an automatic flight control system for an aircraft having two control surfaces, operating means for said control surfaces, a first normally balanced control network, a second normally balanced control network adapted for controlling said operating means, said first control network being isolated from the other network, means responsive to the movement of said aircraft about an axis and connected to said control networks to unbalance said networks, means for transferring the effect of unbalance of said isolated network to the second network whereby unbalance of either network causes the operation of said operating means.

3. Flight control apparatus for an aircraft having two elevon control surfaces, operating means for said control surfaces, normally balanced control networks adapted to control said operating means, one network controlling the operation of said elevons in the same direction, the other network controlling the operation of said elevons in opposite directions, means responsive to the movement of the aircraft about one axis and adapted to unbalance said networks, and follow-up means operated by said operating means and adapted to render said control networks ineffective with respect to said operating means.

4. In a control system, a first impedance network, a second impedance network, transformer means comprising a primary winding connected across said first network and a secondary winding connected across said second network thereby intercoupling said networks, means for unbalancing said first network whereby a voltage signal derived from the first network is applied through the transformer coupling to the second network, a motor means having an amplifier connected to said second network and controlled by said first network through said second network, and a follow up means operated by said motor means and associated with said second network to set up in said second network a signal opposing that applied to said second network.

5. Flight control apparatus for an aircraft having two control surfaces for controlling the movement of the aircraft about an axis, individual reversible operating means for actuating each control surface, control means associated with said operating means for selecting the direction in which the aircraft is to be turned, and follow up means for each operating means, each said follow up means in one position controlling operation of its associated operating means and in another position controlling the operation of both operating means whereby only one control surface may be actuated at a time.

6. Flight control apparatus for an aircraft having two control surfaces for controlling said aircraft about an axis comprising, individual reversible motor means for actuating said control surfaces, a control means including motor control elements associated with said motor means for controlling the direction of movement of both motor means, follow up means actuated by said motor means, the follow up means of each operating means in one extreme position operating a control element to discontinue further movement of its motor means beyond said position, and in another extreme position operating a control element to discontinue further movement of its motor means beyond said other position and to condition said other motor means for operation by said control means.

7. Flight control apparatus for an aircraft having two control surfaces for controlling the movements of the aircraft about an axis, individual reversible operating means for each said control surface, control means, an amplifier associated with said control means, means controlled by said amplifier for selecting the direction in which the aircraft is to be turned and controlling both operating means, and follow up means associated with each said operating means, the follow up means of each operating means in one position controlling its own operating means and in another position controlling the operation of the other operating means.

8. Control apparatus comprising two reversible motor means, control means connected thereto for selecting the direction of rotation of each motor means, and follow up means connected to said control means and operated by each motor means for terminating operation of each motor means, each follow up means in one position engaging rotation limiting means for controlling its motor means and in another position engaging rotation limiting and motor conditioning means for controlling the operation of the other motor means and stopping rotation of its motor means whereby only one motor means is in operation at one time, said control means including a plurality of electrical signal generators and signal combining means for providing a balanceable network and operative connections from each motor means to one signal generator and means for operating a signal generator.

9. Fight control apparatus for an aircraft having elevons for controlling the movement of the aircraft about two axes, individual operating means for each elevon, a control means for each said operating means, means responsive to the movement of the aircraft about one axis and associated with said control means whereby said elevons move in opposite directions and means controlled by the movement of the aircraft about another axis and associated with said control means whereby said elevons are moved in the same direction, each control means including an amplifier having signal input terminals connected to a separate secondary winding the connections of one amplifier to its windings being the reverse of the connections of the other amplifier to its secondary winding, and said responsive means includes a common primary winding for said secondary windings and an adjustable electrical signal generator connected across said primary winding and a tilt responsive means which on movement about one axis in either direction operates one signal generator to provide a voltage in proportion to said tilt but of constant phase and which on tilt about a second axis operates a second signal generator to generate a voltage in proportion to said tilt but of a phase that varies with said tilt, said second signal generator being connected in like phase to each amplifier.

10. Control apparatus for an aircraft having two control surfaces which when moved in the same direction cause a change in the attitude of the craft about one axis and when moved in opposite directions cause a change in attitude of the craft about a second axis at an angle to the first axis, operating means for said control surfaces, means responsive to the attitude of the craft about said axes, a first impedance network, a second impedance network, a transformer having a primary winding and two secondary windings oppositely disposed intercoupling said networks, means associating said networks with said operating means, means for unbalancing one network from said responsive means upon movement of the craft about one axis whereby said operating means moves said control surfaces in the same direction, and means for unbalancing the other network from said responsive means upon movement of the craft about said second axis to cause said other network to control the operating means to move the surfaces in opposite directions.

11. Control apparatus for a dirigible craft comprising: two attitude controlling power mechanisms operable in the same or opposite directions, rudder power mechanism, a control means for each mechanism, a first electrical network for operating said attitude power mechanisms control means to effect movement of said mechanisms in the same direction, a second electrical network for operating said attitude power mechanisms control means to effect movements of said mechanisms in opposite directions, a third electrical network for operating said rudder power mechanism, means responsive to tilt about one axis for adjusting the second and third networks, and means responsive to tilt about an axis at an angle to said one axis to adjust said first network.

12. Control apparatus for an aircraft having elevons operable in opposite directions to control the craft about its roll axis and a pair of rudders operable to provide opposite control of said craft about a second axis, said apparatus comprising: elevon power means; rudder power means for each rudder; control means for said elevon power means, control means for said rudder power means providing individual period rudder operation, means responsive to tilt about one axis to effect operation of both control means to effect operation of said elevons and the operation of one or the other rudder.

13. Control apparatus for an aircraft having elevon control surfaces operable in the same or opposite directions to control the attitude of said craft about two axes, said apparatus comprising: elevon power means; control means for said power means; pick-off means aligned with said roll axis of said craft and responsive to tilt about said axis; and means in said control means operated by said pick-off responsive means for effecting operation of said elevons in the same or in opposite directions.

14. Control apparatus for an aircraft having two elevon control surfaces operable in the same or in opposite directions, said apparatus comprising: elevon power means; normally balanced control networks adapted to control said power means; one network controlling the operation of the elevons in the same direction; the other network controlling the operation of the elevons in the opposite directions; means responsive to tilt about one axis to unbalance one network; means responsive to tilt about a second axis to unbalance the second network; and follow up means operated by said power means and adapted to render said networks ineffective to control said power means lacking further movement of said tilt responsive means.

15. In an automatic flight control system for an aircraft having elevons operable in the same or opposite directions for controlling the aircraft about two axes and rudders for controlling the aircraft about a third axis, operating means for said elevons, operating means for said rudders, means responsive to the movement of said aircraft about one axis, a first control network associated with said elevon operating means and actuated by said responsive means upon tilt of the aircraft about said one axis to effect movement of the elevons in the opposite directions, an additional control network associated with said elevon operating means and actuated by said responsive means upon tilt of the aircraft about said one axis to effect movement of the elevons in the same direction, and control means for said rudder operating means actuated by said responsive means upon tilt of the aircraft about said one axis.

16. Control apparatus for an aircraft having two control surfaces for controlling the attitude of the aircraft about an axis, said apparatus comprising: a reversible motor means for each control surface; a control means for operating each motor means, a balanceable variable impedance network for operating said control means on unbalance thereof, a follow up driven by each motor means to rebalance said network, switch means operated by each follow up means at one extreme position thereof to render its motor means ineffective to drive its follow up further in the same direction and to condition said other motor means for operation by said control means.

17. Control apparatus for an aircraft having two control surfaces for controlling the attitude of said aircraft about an axis thereof, said apparatus comprising: a power means for operating each control surface; amplifier means connected to each power means; a control circuit connected to said amplifier and containing a plurality of electrical signal generators, means for operating one signal generator to unbalance said circuit, means driven by each power means and operating another signal generator to rebalance said circuit, and means operated in one extreme position of a power driven means to prevent further operation of its power means beyond said position and to condition said other power means for operation by said amplifier means.

18. Control apparatus for an aircraft having two elevon surfaces operable in the same direction to change the attitude of the aircraft about its lateral axis and movable in opposite directions to change the attitude of the craft about its roll axis and rudder surfaces for changing the attitude of the craft about its vertical axis, said elevon and rudder control surfaces being located in the wing panels of said aircraft, said apparatus comprising: an individual motor for operating each control surface; tilt responsive means operable proportional to movement of said craft about the lateral axis for operating both elevon motors to move the elevons in the same direction, tilt responsive means operable proportional to movement of said craft about the roll axis for operating both elevon motors to move the elevons in opposite directions; means including follow-up means operated by each elevon motor to effect termination of its operation in accordance with the combined proportional effect of both tilt responsive means on said motor, and means for operating one of said rudder motors in proportion to the response of said roll responsive means.

19. In an automatic flight control apparatus for an aircraft having two rudder control surfaces for controlling the attitude of said craft about an axis thereof; a separate motor means for reversibly operating each control surface; control means for both operating means to effect their operation; means for providing signals of reversible phase to said control means to affect the operating means and thus the movement of said craft about said axis in either direction; and further means controlled by the positions of said motor means to determine which motor means will position its control surface in response to a signal.

20. Control apparatus for an aircraft having two elevon surfaces operable in the same direction to change the attitude of the aircraft about its lateral axis and movable in opposite directions to change the attitude of the craft about its roll axis, said elevon control surfaces being located in the wing panels of said aircraft, said apparatus comprising: an individual motor for operating each control surface; tilt responsive means operable proportional to movement of said craft about the lateral axis for operating both elevon motors to move the elevons in the same direction; tilt responsive means operable proportional to movement of said craft about the roll axis for operating both elevon motors to move the elevons in opposite directions; and means including follow-up means operated by each elevon motor to effect termination of its operation in accordance with the combined proportional effect of both tilt responsive means on said motor.

21. Flight control apparatus for an aircraft having two control surfaces; separate operating means for each said control surfaces; three normally balanced control networks arranged in two pairs, with one network common to both pairs with one pair adapted to control an operating means, said networks in each pair being connected through a magnetic coupling; follow-up means associated with one network in a pair and driven by its operating means; and means for unbalancing the common network, whereby a voltage derived from said common unbalanced network is applied through said coupling to the other network in each pair and each said other network is controlled by its follow-up to set up an equal but opposing voltage signal to that applied by said common network.

DAVID L. MARKUSEN.

(References on following page)

REFERENCES CITED

The following references are of record in the file of this patent:

UNITED STATES PATENTS

| Number | Name | Date |
|---|---|---|
| 1,565,097 | Nummert | Dec. 8, 1925 |
| 1,599,574 | McShane et al. | Sept. 14, 1926 |
| 1,811,149 | Petersen | June 23, 1931 |
| 1,970,584 | Stewart | Aug. 21, 1934 |
| 2,173,538 | McKellar | Sept. 19, 1939 |
| 2,367,869 | Jones | Jan. 23, 1945 |
| 2,412,647 | Northrop et al. | Dec. 17, 1946 |
| 2,415,430 | Frische et al. | Feb. 11, 1947 |
| 2,417,821 | Harcum et al. | Mar. 25, 1947 |
| 2,464,629 | Young | Mar. 15, 1949 |

FOREIGN PATENTS

| Number | Country | Date |
|---|---|---|
| 431,850 | Great Britain | July 10, 1935 |

Certificate of Correction

Patent No. 2,558,096 — June 26, 1951

DAVID L. MARKUSEN

It is hereby certified that error appears in the printed specification of the above numbered patent requiring correction as follows:

Column 2, line 48, for "set" read *sets*; column 9, line 4, for "and" read *end*; column 10, line 62, after "upper" read *spring*; column 12, line 56, for "wiper 218" read *wiper 318*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*